United States Patent
Ramesh et al.

(10) Patent No.: US 10,474,310 B2
(45) Date of Patent: Nov. 12, 2019

(54) NON-MODAL TOOLBAR CONTROL

(71) Applicant: Adobe Inc., San Jose, CA (US)

(72) Inventors: Vignesh Ramesh, San Francisco, CA (US); Anusard Korlarpkitkul, San Francisco, CA (US); Mili Sharma, New Delhi (IN); Manasi P. Agarwal, Noida (IN); Liang-Cheng Lin, Milpitas, CA (US); Jamie L. Myrold, Chicago, IL (US)

(73) Assignee: Adobe Inc., San Jose, CA (US)

( * ) Notice: Subject to any disclaimer, the term of this patent is extended or adjusted under 35 U.S.C. 154(b) by 332 days.

(21) Appl. No.: 14/697,247

(22) Filed: Apr. 27, 2015

(65) Prior Publication Data

US 2016/0313895 A1    Oct. 27, 2016

(51) Int. Cl.
*G06F 3/0481* (2013.01)
*G06F 9/445* (2018.01)
*G06F 9/451* (2018.01)

(52) U.S. Cl.
CPC ........ *G06F 3/0481* (2013.01); *G06F 9/44505* (2013.01); *G06F 9/451* (2018.02)

(58) Field of Classification Search
CPC ... G06F 9/4443; G06F 9/44505; G06F 3/0481
See application file for complete search history.

(56) References Cited

U.S. PATENT DOCUMENTS

| | | | | |
|---|---|---|---|---|
| 5,644,737 A * | 7/1997 | Tuniman | ............... | G06F 3/0481 715/810 |
| 6,057,836 A * | 5/2000 | Kavalam | ............... | G06F 3/0481 715/779 |
| 6,133,915 A * | 10/2000 | Arcuri | ................... | G06F 3/0481 715/779 |
| 6,229,539 B1 * | 5/2001 | Morcos | ................. | G06F 9/4443 715/808 |
| 6,232,972 B1 * | 5/2001 | Arcuri | ................... | G06F 3/0482 715/815 |
| 6,384,849 B1 * | 5/2002 | Morcos | ................. | G06F 9/4443 715/810 |

(Continued)

*Primary Examiner* — Abdullah Al Kawsar
*Assistant Examiner* — Jeremy L Stanley
(74) *Attorney, Agent, or Firm* — SBMC

(57) ABSTRACT

Non-modal toolbar control techniques are described. In one or more implementations, techniques are described for controlling output by one or more computing devices of a toolbar with content in a user interface in a manner that supports non-modal interaction with both the toolbar and the content. Display of the user interface is caused by the one or more computing devices, the user interface including a simultaneous display of the toolbar along an edge of the user interface adjacent to and not overlapping the content. The toolbar includes a representation of a task and a plurality of parameters associated with the task. Selection is detected by the one or more computing devices of one or more of the plurality of parameters via the user interface. Selection is also detected of the representation of the task subsequent to the selection of the one or more parameters. Responsive to the selection of the representation, the task is performed on the content by the one or more computing devices using the selected ones of the plurality of parameters.

20 Claims, 7 Drawing Sheets

(56) References Cited

U.S. PATENT DOCUMENTS

| | | | | |
|---|---|---|---|---|
| 6,686,938 B1* | 2/2004 | Jobs | G06F 3/0481 | 715/769 |
| 6,819,343 B1* | 11/2004 | Sobeski | G06F 9/4443 | 715/762 |
| 7,528,847 B2* | 5/2009 | Braun | G06F 3/0481 | 345/619 |
| 2002/0149623 A1* | 10/2002 | West | G06F 9/4443 | 715/765 |
| 2003/0058286 A1* | 3/2003 | Dando | G06F 9/4443 | 715/853 |
| 2005/0204309 A1* | 9/2005 | Szeto | H04L 12/5845 | 715/811 |
| 2006/0129945 A1* | 6/2006 | Dettinger | G06F 3/0486 | 715/769 |
| 2007/0006090 A1* | 1/2007 | Lee | G06F 3/1205 | 715/771 |
| 2008/0072234 A1* | 3/2008 | Myroup | G06F 3/0481 | 718/106 |
| 2008/0092171 A1* | 4/2008 | Roberts | G06F 3/0482 | 725/46 |
| 2008/0155617 A1* | 6/2008 | Angiolillo | H04N 7/17318 | 725/93 |
| 2009/0019379 A1* | 1/2009 | Pendergast | G06F 17/30011 | 715/762 |
| 2009/0094554 A1* | 4/2009 | Karstens | G06F 3/04817 | 715/810 |
| 2009/0228814 A1* | 9/2009 | Kobayashi | G06F 3/04855 | 715/764 |
| 2009/0271735 A1* | 10/2009 | Anderson | G06F 3/0482 | 715/815 |
| 2010/0131887 A1* | 5/2010 | Salazar-Ferrer | G06F 3/0481 | 715/788 |
| 2011/0182502 A1* | 7/2011 | Liang | G06T 1/00 | 382/162 |
| 2011/0291970 A1* | 12/2011 | Liu | G06F 3/0416 | 345/173 |
| 2012/0176308 A1* | 7/2012 | Westermann | G06F 3/038 | 345/156 |
| 2012/0254781 A1* | 10/2012 | Larsen | G06F 3/0481 | 715/765 |
| 2012/0293558 A1* | 11/2012 | Dilts | G09G 5/24 | 345/676 |
| 2013/0125041 A1* | 5/2013 | Doan | G06F 9/4443 | 715/781 |
| 2013/0235069 A1* | 9/2013 | Ubillos | G09G 5/026 | 345/594 |
| 2013/0235071 A1* | 9/2013 | Ubillos | G06F 3/0484 | 345/600 |
| 2013/0235074 A1* | 9/2013 | Cherna | G06T 11/60 | 345/619 |
| 2013/0238724 A1* | 9/2013 | Cunningham | H04L 51/24 | 709/206 |
| 2014/0063047 A1* | 3/2014 | Johnson | G09G 5/028 | 345/594 |
| 2014/0129964 A1* | 5/2014 | Bleth | G06Q 10/06 | 715/760 |
| 2015/0003595 A1* | 1/2015 | Yaghi | G06Q 10/063 | 379/85 |
| 2015/0067513 A1* | 3/2015 | Zambetti | G06F 3/0482 | 715/716 |
| 2015/0277748 A1* | 10/2015 | Shin | G06F 9/44 | 715/773 |
| 2015/0326912 A1* | 11/2015 | Casagrande | H04N 21/4312 | 386/230 |
| 2015/0363949 A1* | 12/2015 | Manohar | H04L 41/145 | 345/441 |
| 2016/0139774 A1* | 5/2016 | Rivard | G06F 3/04842 | 715/781 |
| 2016/0182854 A1* | 6/2016 | Suzuki | H04N 7/147 | 348/14.07 |

* cited by examiner

500

502
Cause display of the user interface by the one or more computing devices, the user interface including a simultaneous display of the toolbar along an edge of the user interface adjacent to and not overlapping the content, the toolbar including a representation of a task and a plurality of parameters associated with the task

504
Detect selection by the one or more computing devices of one or more of the plurality of parameters via the user interface

506
Detect selection of the representation of the task subsequent to the selecting of the one or more parameters

508
Responsive to the selection of the representation, perform the task on the content by the one or more computing devices using the selected ones of the plurality of parameters

602
Display a user interface by the display device, the user interface including a simultaneous display of a first toolbar along an edge of the user interface adjacent to and not overlapping content

604
Cause display of a secondary toolbar adjacent to the first toolbar and not overlapping the content responsive to selection of an option in the menu bar

606
Cause display of a tertiary toolbar adjacent to the secondary toolbar and not overlapping the content responsive to selection of an option relating to a task to be performed by the one or more computing devices, the tertiary toolbar including a representation of the task that is selectable to cause performance of the task and a plurality of parameters associated with the performance of the task

608
Responsive to the selection of the representation, perform the task on the content by the one or more computing devices using selected ones of the plurality of parameters

*Fig. 6*

NON-MODAL TOOLBAR CONTROL

BACKGROUND

Users have access to a multitude of tasks when interacting with applications. For example, a document viewing application may include tasks relating to extraction of pages, insertion of pages, replacement of pages, and so on. Additionally, each of these tasks may be a plurality of properties used to define the tasks, such as to delete or extract pages separate for an extract pages task.

Conventionally, however, users are given access to specify these properties and initiate performance of these tasks through use of a modal menu. The menu, for instance, may be configured as a "pop up" menu that is displayed over the content. To dismiss the menu, a user is forced in conventional techniques to initiate performance of the task or cancel the task. Accordingly, these conventional techniques interfered with the output of the content and necessitated user interaction to remove, which could be frustrating to users.

SUMMARY

Non-modal toolbar control techniques are described. In one or more implementations, techniques are described for controlling output by one or more computing devices of a toolbar with content in a user interface in a manner that supports non-modal interaction with both the toolbar and the content. Display of the user interface is caused by the one or more computing devices, the user interface including a simultaneous display of the toolbar along an edge of the user interface adjacent to and not overlapping the content. The toolbar includes a representation of a task and a plurality of parameters associated with the task. Selection is detected by the one or more computing devices of one or more of the plurality of parameters via the user interface. Selection is also detected of the representation of the task subsequent to the selection of the one or more parameters. Responsive to the selection of the representation, the task is performed on the content by the one or more computing devices using the selected ones of the plurality of parameters.

In one or more implementations, a system includes one or more computing devices having a display device, a processing system and a memory configured to maintain a toolbar control module that is executable by the processing system to perform one or more operations. The operations include display of a user interface by the display device, the user interface including a simultaneous display of a first toolbar along an edge of the user interface adjacent to and not overlapping content and causing display of a secondary toolbar adjacent to the first toolbar and not overlapping the content responsive to selection of an option in the first toolbar. The operations also include causing display of a tertiary toolbar adjacent to the secondary toolbar and not overlapping the content responsive to selection of an option relating to a task to be performed, the tertiary toolbar including a representation of the task that is selectable to cause performance of the task and a plurality of parameters associated with the performance of the task and responsive to the selection of the representation, performing the task on the content using selected ones of the plurality of parameters.

In one or more implementations, a system includes one or more computing devices having a display device, a processing system and a memory configured to maintain a toolbar control module that is executable by the processing system to perform one or more operations. The operations include displaying a user interface by the display device, the user interface including a simultaneous display of the toolbar along an edge of a user interface adjacent to and not overlapping content of the user interface and managing the user interface such that non-modal interaction is permitted with both the content and the toolbar during the display of the toolbar.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 5 is a flow diagram depicting a procedure in an example implementation in which techniques are described of controlling output by one or more computing devices of a toolbar with content in a user interface in a manner that supports non-modal interaction with both the toolbar and the content.

FIG. 6 is a flow diagram depicting a procedure in an example implementation in which control of a tertiary toolbar is described.

DETAILED DESCRIPTION

Overview

Conventional techniques to enable users to specify parameters that are to be used as part of performance of a task by a computing device relied on modal menus that interfered with a display of content that is a subject of the task. For example, a modal dialog box may be used in conventional techniques that is displayed over a view of the content and in this way interfered with a user's interaction with the content. Further, because the dialog box is modal a user is forced in conventional techniques to interact with the dialog box and thus is taken away from a current usage context, even in instances in which the dialog box is output in error in order to dismiss the dialog box, which is frustrating, inefficient, and interferes with a user's interaction with the content.

Non-modal toolbar control techniques are described. In one or more implementations, a toolbar is controlled by a computing device that does not obstruct a user's view and keeps the user in an original context. Thus, the toolbar is non-modal in that a user is not navigated away from a current usage context (e.g., using different interaction modes such as in the conventional dialog box above) and thus permits a user to freely interact with the toolbar and portions outside the toolbar.

The toolbar, for instance, may be displayed along an edge of a user interface, e.g., an edge of a window, display device, and so on. When output, content in the user interface is moved through use of an animation such that the toolbar does not obstruct any portion of the content. Additionally, because the toolbar is non-modal, a user may freely interact with parameters included in the toolbar and even with the content itself before committing to performance of a task. In this way, efficient user interaction is supported with the user interface, further discussion of these and other examples is contained in the following sections and is shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
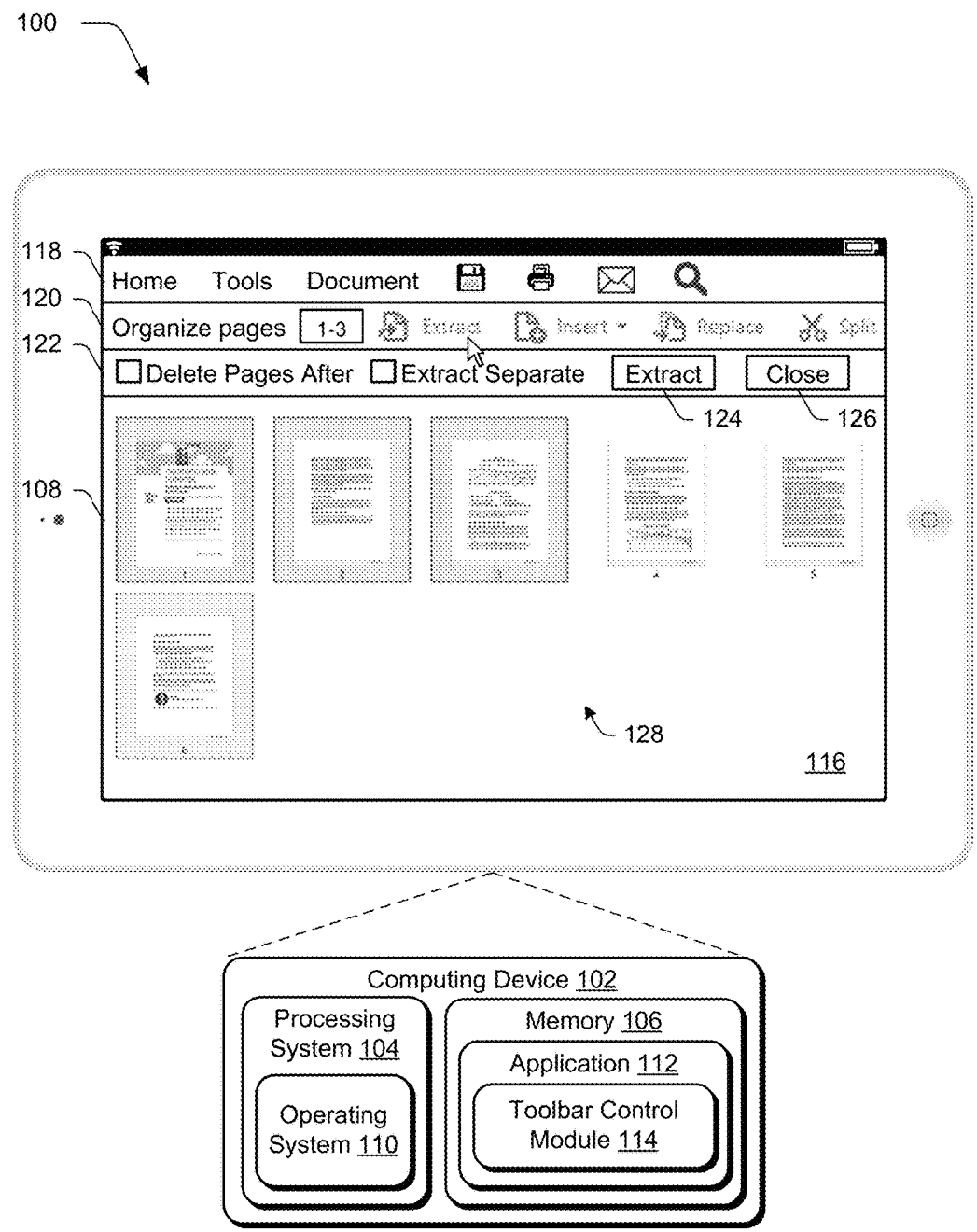
FIG. 1 is an illustration of an environment in an example implementation that is operable to employ non-modal toolbar techniques described herein

FIG. 1 is an illustration of an environment 100 in an example implementation that is operable to employ the non-modal toolbar techniques described herein. The illustrated environment 100 includes a computing device 102, which may be configured in a variety of ways.

For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is illustrated as including a variety of hardware components, examples of which include a processing system 104, an example of a computer-readable storage medium illustrated as memory 106, a display device 108, and so on. Other hardware components are also contemplated as further described in relation to FIG. 7. The processing system 104 is representative of functionality to perform operations through execution of instructions stored in the memory 106. Although illustrated separately, functionality of these components may be further divided, combined (e.g., on an application specific integrated circuit), and so forth.

The computing device 102 is further illustrated as including an operating system 110. The operating system 110 is configured to abstract underlying functionality of the computing device 102 to applications 112 that are executable on the computing device 102. For example, the operating system 110 may abstract processing system 104, memory 106, and/or display device 108 functionality of the computing device 102 such that the applications 112 may be written without knowing "how" this underlying functionality is implemented. The application 112, for instance, may provide data to the operating system 110 to be rendered and displayed by the display device 108 or printer 116 without understanding how this rendering will be performed. The operating system 110 may also represent a variety of other functionality, such as to manage a file system and user interface that is navigable by a user of the computing device 102.

The application 112 is further illustrated as including a toolbar control module 114. The toolbar control module 114 is representative of functionality to manage a user interface 116, including display of toolbars and control of tasks and parameters represented by the toolbars. As illustrated in the user interface 116, for instance, a first toolbar 118 is illustrated having representations of categories of types of tasks, e.g., Home, Tools, and Document. The first toolbar 118 also includes representations of commonly-used tasks that may be initiated directly from the menu bar 118, e.g., to save, print, email, and search as illustrated, through selection by a cursor control device (e.g., mouse), via a gesture, utterance, and so forth. The first toolbar 118 is illustrated as displayed proximal to an edge of the user interface 116, which in this instance corresponds to an edge of the display device 118 and follows at least a majority of that edge. Other examples are also contemplated, such as to follow an edge of a window displayed without the user interface 116.

Selection of one of the categories causes output of a first toolbar 118, e.g., "Document" in the illustrated example, causes output of a secondary toolbar 120 proximal to the first toolbar 118 that follows an edge formed by the first toolbar 118. The secondary toolbar 120 also includes representations of tasks that are performable by the computing device 102. In this instance, however, one or more of the tasks are associated with parameters that specify how the task is to be performed and thus are to be selected before performance of the task.

For example, a cursor is illustrated as selecting an option to "Extract" pages of a document. In response, a tertiary toolbar 122 is output. The tertiary toolbar 122 includes representations of a plurality of parameters that are selectable (e.g., via a gesture, cursor control device, and so on) to specify how the extraction task is to be performed, e.g., "Delete Pages After" and "Extract Separate." The tertiary toolbar 122 also includes a representation 124 of the task that is selectable to initiate performance of the task and also an option 126 to close the tertiary toolbar 122. Other ways to close the tertiary toolbar 126 are also contemplated, such as to treat the option of the secondary toolbar 120 that caused display (e.g., a representation "Extract") as a toggle to display or not display the tertiary toolbar 122. In this way, a user may select one or more parameters associated with a task and then commit to performance of the task through selection of the representation 124.

Additionally, control of the toolbars by the toolbar control module 114 may be performed to support non-modal interaction. For example, rather than display the parameters and the representation of the task in a modal dialog box over a display of content 128, the tertiary toolbar 122 may be displayed along an edge of the user interface 116 and proximal to other toolbars so as not to interfere with the display of the content 128. In this way, a user remains in the context of the content 128 such that interaction with the content 128 may be performed while the tertiary toolbar 122 is displayed. This is unlike conventional modal dialog boxes that required manual interaction to remove display of the box to access underlying content that is not accessible to a user while the box is displayed. Further description of non-modal toolbar control techniques is discussed in the following and shown in corresponding figures.

Figure 2:
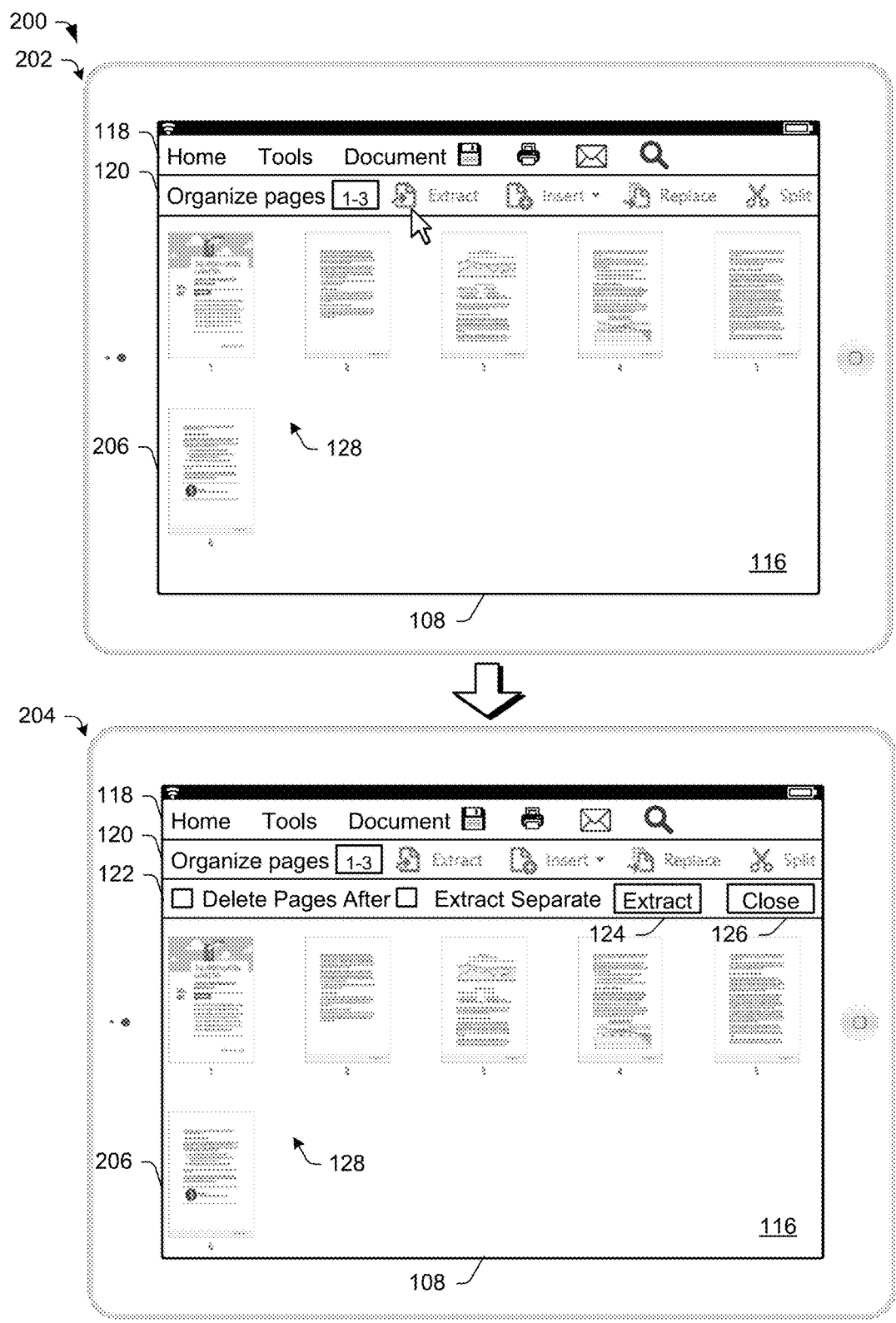
FIG. 2 depicts a system in an example implementation of toolbar control.

FIG. 2 depicts a system 200 in an example implementation of toolbar control. The system 200 is illustrated using first and second stages 202, 204. At the first stage 202, a user interface 116 is output by the display device 108 that includes the first and secondary toolbars 118, 120 as previously described in relation to FIG. 1. The secondary toolbar 120 in this example is configured to organize pages in a document as part of an application 112 configured for document viewing. Other examples are also contemplated, such as through implementation as a plugin module (e.g., for a browser), as part of the operating system 110, a stand-alone application, and so on.

The user interface 118 also includes a portion 206 that displays content 128 simultaneously with the first and secondary toolbars 118, 120. The content 128 in this example includes representations (e.g., thumbnails) of pages of the document being viewed. Thus, the first and second toolbars 118, 120 are non-modal in that a user may choose to interact with either of the toolbars or the content 128 without manual switching between modes, e.g., as required in conventional overlaid dialog boxes as previously described. A cursor is illustrated as selecting an option related to a task to extract pages from a document at the first stage 202.

In response, the toolbar control module 114 of FIG. 1 causes display of the tertiary toolbar 122 that includes a plurality of parameters that are selectable to specify how a corresponding task (e.g., extraction) is to be performed, e.g., to delete pages after extraction or extract the pages as separate files. The tertiary toolbar 122 also includes a representation 124 to initiate performance of the task as well as an option 126 to close the tertiary toolbar 122.

As illustrated, display of the tertiary toolbar 122 causes resizing of the portion 206 of the user interface 116 used to display the content 128. This may be performed in a variety of ways, such as through output of an animation by the toolbar control module 114 to "slide the content 128 downward" in the user interface. Other examples are also contemplated, such as shrinking of a display size of the content 128. In this way, the output of the tertiary toolbar 122 does not obscure a user's view of the content 128.

Figure 3:
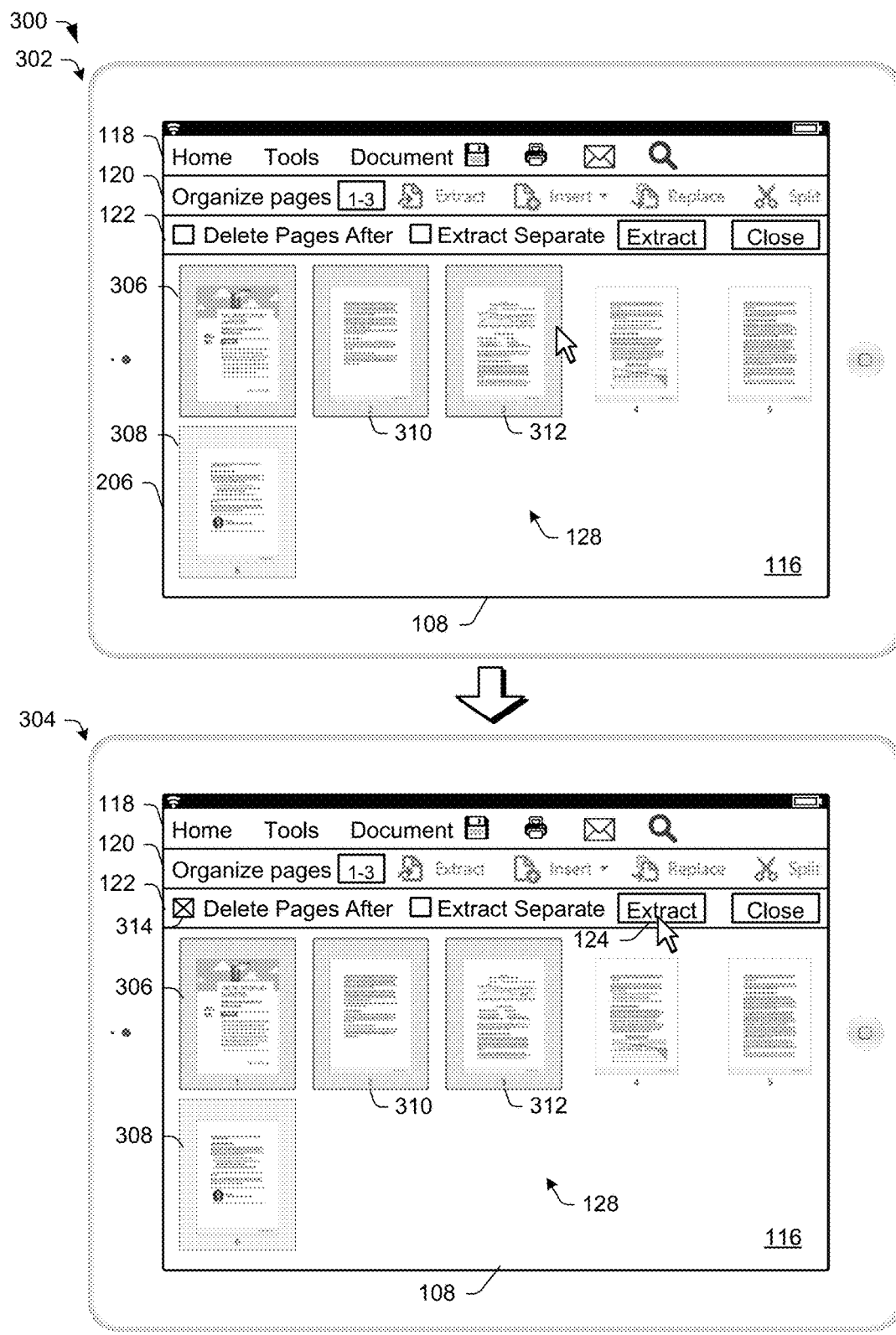
FIG. 3 depicts a system in an example implementation of non-modal interaction with a toolbar of FIG. 2.

FIG. 3 depicts a system 300 in an example implementation of non-modal interaction with a toolbar of FIG. 2. The system 300 of FIG. 3 is also illustrated using first and second stages 302, 304. At the first stage 302, the first, secondary, and tertiary toolbars 118, 120, 122 are displayed concurrently with content 128 in the user interface 116. In this example, a user employs a cursor control device to select representations of pages 306, 308, 310, 312 to be extracted from the document as part of the extraction task. In this way, the non-modal interaction is supported through simultaneous display of the content 128 and the toolbars without requiring a user to navigate away from the display of the content and/or obscure portions of the content 128 as required in conventional modal dialog boxes.

The selection of the representations 306-312 of the pages remains at the second stage 304, in which a user also selects a parameter 314 "Delete Pages After" and then selects the representation 124 of the task to initiate performance of the task. Thus, in this example a user may freely interact with content 128 and the toolbars without switching between modes of interaction and thus keeps a user in an original context of the content 128 without change. This also permits a user to interact with the content 128 to specify how the task is to be performed outside of the toolbars in this example, which is not possible in conventional modal techniques that limited action to within the dialog box.

It is also notable that the toolbars 118, 120, 122 are configurable to follow a direction in which a user typically reads, e.g., left to right in this example such that the user may read the parameters that are selectable, select them if desired, and then continue to the right to select the representation to cause initiation of the task, e.g., commit the call to action. The non-modal interaction supported by the toolbars may also be utilized to permit navigation to different items of content, and example of which is described in the following and shown in a corresponding figure.

Figure 4:
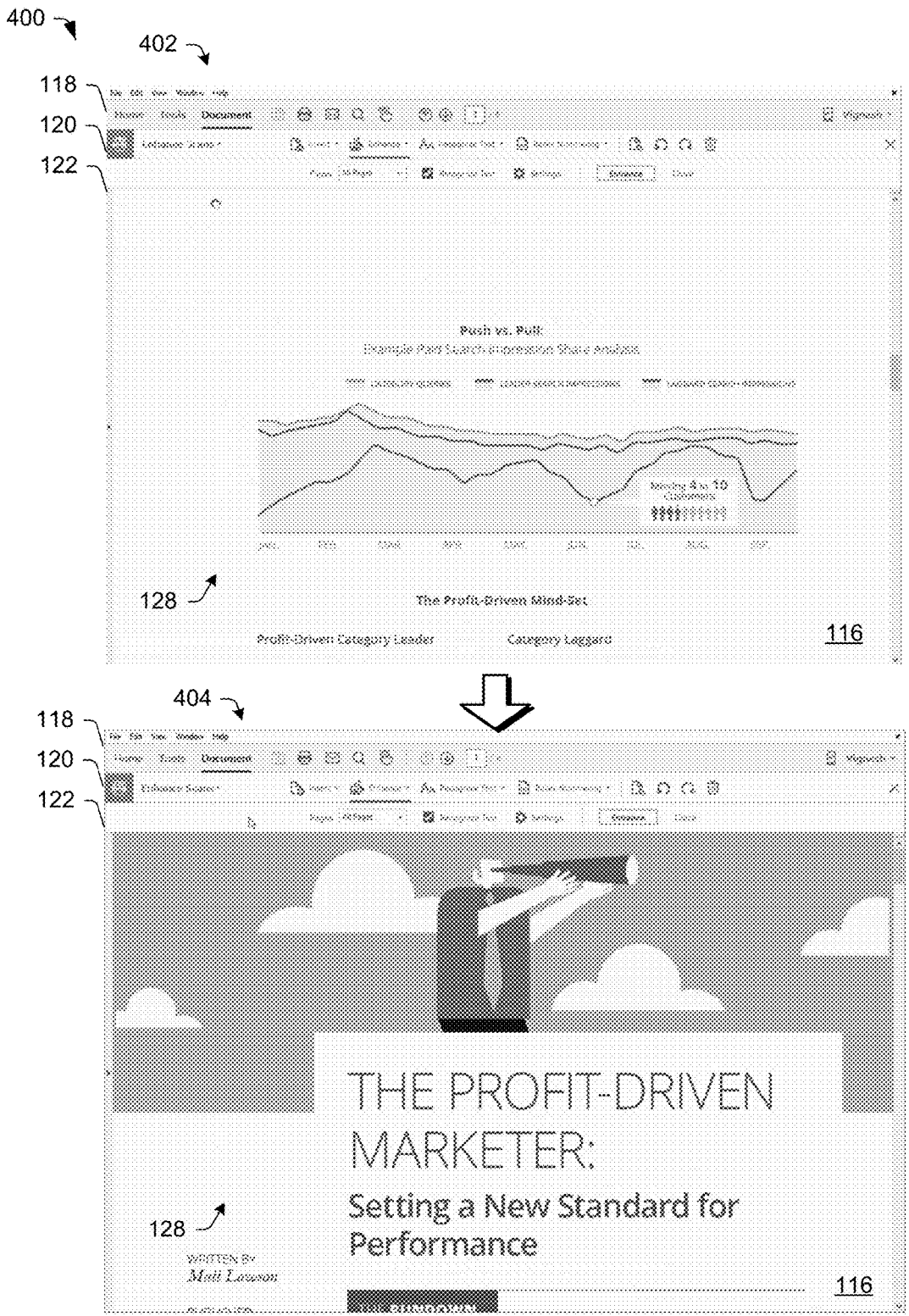
FIG. 4 depicts a system in an example implementation in which non-modal navigation between different items of content is shown.

FIG. 4 depicts a system 400 in an example implementation in which non-modal navigation between different items of content is shown. The system is shown using first and second stages 402, 404. At the first stage 402, first, secondary, and tertiary toolbars 118, 120, 122 are displayed in the user interface as previously described. Content 128 involving a graphical analysis is displayed. A user then switches to a front-page of marketing material as shown in the second stage 404 without dismissing the first, secondary, and tertiary toolbars 118, 120, 122. In this way, a user may intuitively navigate between content and tasks supported by the toolbars in a non-modal manner, further discussion of which may be found in the following procedures and is shown in corresponding figures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

FIG. 5 depicts a procedure 500 in an example implementation in which techniques are described of controlling output by one or more computing devices of a toolbar with content in a user interface in a manner that supports non-modal interaction with both the toolbar and the content. Display of the user interface is caused by the one or more computing devices, the user interface including a simultaneous display of the toolbar along an edge of the user interface adjacent to and not overlapping the content, the toolbar including a representation of a task and a plurality of parameters associated with the task (block 502). As shown in FIG. 1, for instance, the toolbar control module 114 causes output of a tertiary toolbar 122 along an edge of the user interface 116 formed by the first and secondary toolbars 118, 120.

Selection is detected by the one or more computing devices of one or more of the plurality of parameters via the user interface (block 504). A user, for instance, may select a parameter "Delete Pages After" as shown in the second stage 304 of FIG. 3.

Selection is also detected of the representation of the task subsequent to the selection of the one or more parameters (block 506). After selection of the parameter, a user then selects the representation 124 of the task "Extract" to commit performance of the task.

Responsive to the selection of the representation, the task is performed on the content by the one or more computing devices using the selected ones of the plurality of parameters (block 508), which in this case is to delete pages after extraction from a document. A variety of other examples are also contemplated.

FIG. 6 depicts a procedure 600 in an example implementation in which control of a tertiary toolbar is described. In this example, the system includes one or more computing devices having a display device, a processing system and a memory configured to maintain a toolbar control module that is executable by the processing system to perform one or more operations. The operations include displaying a user interface by the display device, the user interface including a simultaneous display of a first toolbar along an edge of the user interface adjacent to and not overlapping content (block 602). As shown in FIG. 1, for instance, a first toolbar 118 is displayed along an edge of the user interface 116 that corresponding to an edge of the display device 108.

Display is caused of a secondary toolbar adjacent to the first toolbar and not overlapping the content responsive to selection of an option in the first toolbar (block 604). Continuing with the previous example, a user may then select an option to organize pages, which causes output of the secondary toolbar 120 proximal to the first toolbar 118.

Display is caused of a tertiary toolbar adjacent to the secondary toolbar and not overlapping the content responsive to selection of an option relating to a task to be performed (block 606). The tertiary toolbar includes a representation of the task that is selectable to cause performance of the task and a plurality of parameters associated with the performance of the task. The module, for instance, may detect existence of the parameters and in response cause output of the tertiary toolbar to have those parameters and a representation of the task to initiate execution. A user may then select a task that is associated with parameters that specify how the task is to be performed. Accordingly, the toolbar control module 114 causes output of the tertiary toolbar 122 that includes these parameters and an option to commit performance of the task by the computing device 102.

Responsive to the selection of the representation, the task is performed on the content by the one or more computing devices using selected ones of the plurality of parameters (block 608). As previously described, this permits non-modal interaction that does not interfere with display of the content 128.

Example System and Device

Figure 7:
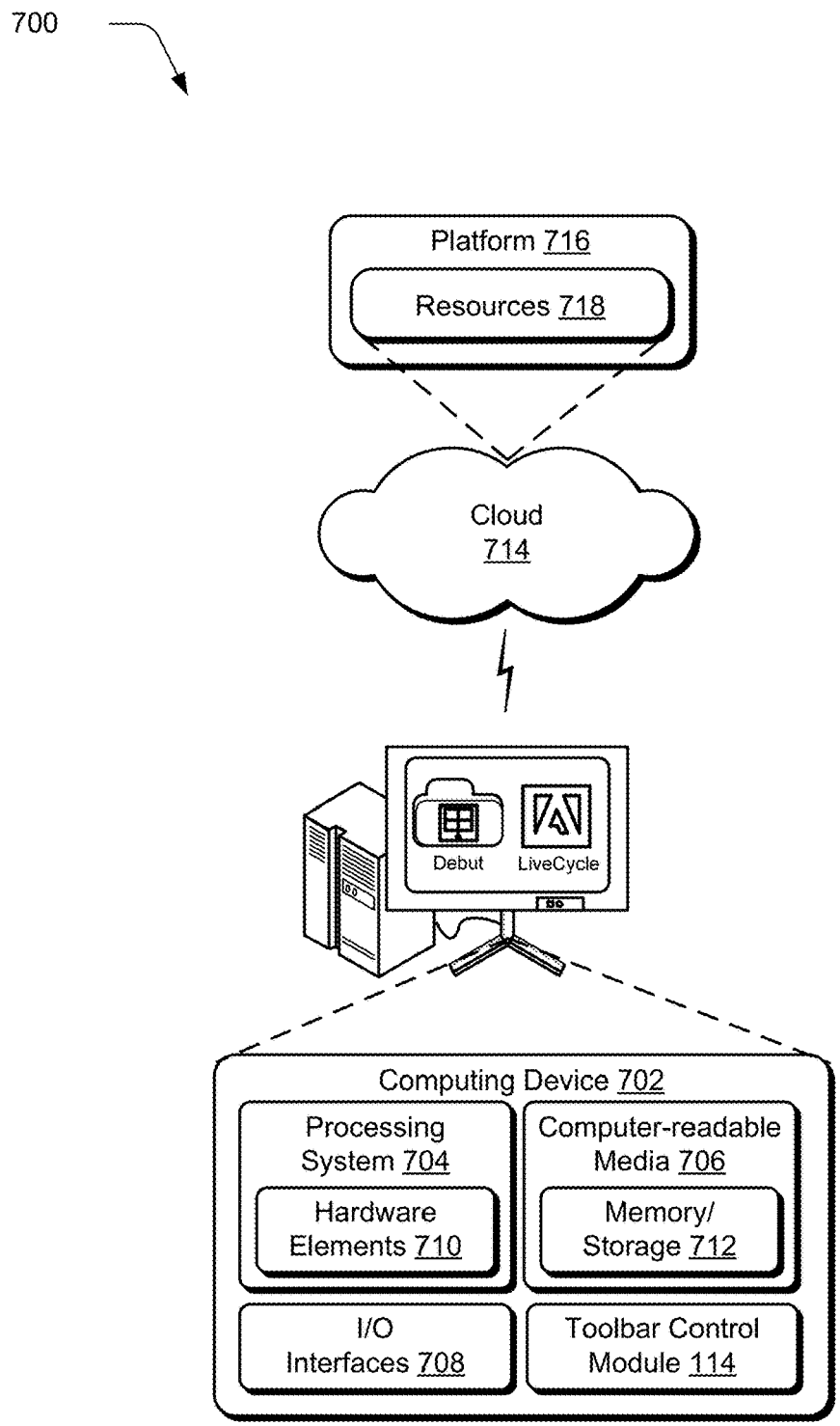
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the toolbar control module 114. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
one or more computing devices having a display device, a processing system, and a memory configured to maintain a toolbar control module that is executable by the processing system to perform one or more operations comprising:
displaying, by the display device, a user interface including a simultaneous display of content within a defined content region and a first toolbar, the first toolbar including selectable task category options that are each associated with different categories of tasks that are performable to affect the content, and the content displayed within the user interface including a plurality of simultaneously displayed individual pages of a multipage document;
causing display of a secondary toolbar adjacent the first toolbar responsive to selection of a selectable task category option in the first toolbar, the secondary toolbar including selectable task options that are associated with different tasks within a task category represented by the selectable task category option;
receiving a plurality of inputs selecting a plurality of the simultaneously displayed individual pages, wherein the selected pages correspond to a subset of individual pages of the multipage document, and the subset of individual pages includes less than all of the pages of the multipage document, and greater than a single page of the multipage document;

displaying a representation of the subset of individual pages in the secondary toolbar;

causing display of a tertiary toolbar adjacent the secondary toolbar responsive to selection of a selectable task option from the secondary toolbar, the tertiary toolbar including: task parameters that each specify a different way in which a task represented by the selectable task option is to be performed in relation to the subset of individual pages of the multipage document, and a selectable representation of the task represented by the selectable task option in the secondary toolbar;

configuring the first toolbar, secondary toolbar, and tertiary toolbar as non-modal such that interaction with the content and the first toolbar, secondary toolbar, and tertiary toolbar is permitted during display of the first toolbar, secondary toolbar, and tertiary toolbar;

receiving a selection of one or more of the task parameters from the tertiary toolbar, and a subsequent selection of the selectable representation of the task from the tertiary toolbar; and performing the task on the content displayed within the user interface by processing the subset of individual pages of the multipage document using the selected one or more task parameters, and maintaining display of the first toolbar, secondary toolbar, and tertiary toolbar after performance of the task.

2. A system as described in claim 1, wherein the display of the tertiary toolbar along with the content is configured to permit selection of one or more of the task parameters and interaction with the content before committing to the performance of the task through selection of the selectable representation of the task in the tertiary toolbar.

3. A system as described in claim 1, wherein the selection of the selectable task option from the secondary toolbar to cause output of the tertiary toolbar causes output of an animation that moves or resizes the content in the user interface, the tertiary toolbar not obstructing display of the content.

4. A system as described in claim 1, wherein the first toolbar, the secondary toolbar, and the tertiary toolbar are simultaneously displayed in a hierarchical arrangement that enables user interaction with each of the toolbars while the toolbars are simultaneously displayed.

5. A system as described in claim 1, wherein the selected one or more task parameters further identify a relationship between the subset of individual pages, and one or more pages of the multipage document not identified in the secondary toolbar.

6. A system as described in claim 1, wherein said performing the task comprises applying the task to one or more pages of the multipage document not selected from the plurality of simultaneously displayed individual panes of the multipage document.

7. A system as described in claim 1, wherein said performing the task comprises deleting one or more pages of the multipage document not selected from the plurality of simultaneously displayed individual pages of the multipage document.

8. A method implemented by at least one computing device, the method comprising:

displaying a user interface including a simultaneous display of content within a defined content region and a first toolbar along an edge of the user interface adjacent and separate from the content, the first toolbar including selectable task category options that are each associated with different categories of tasks that are performable to affect the content, and the content displayed within the user interface including a plurality of simultaneously displayed individual pages of a multipage document;

causing display of a secondary toolbar adjacent the first toolbar responsive to selection of a selectable task category option in the first toolbar, the secondary toolbar including selectable task options that are associated with different tasks within a task category represented by the selectable task category option;

receiving a plurality of inputs selecting a plurality of the simultaneously displayed individual pages, wherein the selected pages correspond to a subset of individual pages of the multipage document, and the subset of individual pages includes less than all of the pages of the multipage document, and greater than a single page of the multipage document;

displaying a representation of the subset of individual pages in the secondary toolbar;

causing display of a tertiary toolbar adjacent the secondary toolbar responsive to selection of a selectable task option from the secondary toolbar, the tertiary toolbar including: task parameters that each specify a different relationship of a task represented by the selectable task option to the subset of individual pages of the multipage document, and a selectable representation of the task represented by the selectable task option from the secondary toolbar;

configuring the first toolbar, secondary toolbar, and tertiary toolbar as non-modal such that interaction with the content and the first toolbar, secondary toolbar, and tertiary toolbar is permitted during display of the first toolbar, secondary toolbar, and tertiary toolbar;

receiving a selection of one or more of the task parameters from the tertiary toolbar, and a subsequent selection of the selectable representation of the task represented by the selectable task option from the tertiary toolbar; and performing the task on the content displayed within the user interface by processing the subset of individual pages of the multipage document using the selected one or more task parameters, and maintaining display of the first toolbar, secondary toolbar, and tertiary toolbar after performance of the task.

9. A method as described in claim 8, wherein the display of the tertiary toolbar along with the content is configured to permit selection of one or more of the task parameters and interaction with the content before committing to the performance of the task through selection of the selectable representation of the task in the tertiary toolbar.

10. A method as described in claim 8, wherein the user interface is a window and the edge is an edge of the window.

11. A method as described in claim 8, wherein the edge of the user interface corresponds to an edge of a display device.

12. A method as described in claim 8, wherein the selection of the selectable task option from the secondary toolbar to cause output of the tertiary toolbar causes output of an animation that moves or resizes the content in the user interface, the tertiary toolbar not obstructing display of the content.

13. A method as described in claim 8, wherein the first toolbar, the secondary toolbar, and the tertiary toolbar are simultaneously displayed in a hierarchical arrangement that enables user interaction with each of the toolbars while the toolbars are simultaneously displayed.

14. A method as described in claim 8, wherein:
the selected one or more task parameters further identify a relationship between the subset of individual pages identified in the secondary toolbar, and one or more pages of the multipage document not selected from the plurality of simultaneously displayed individual pages of the multipage document; and
said performing the task comprises applying the task to the one or more pages of the multipage document not selected from the plurality of simultaneously displayed individual pages of the multipage document.

15. A method as described in claim 14, wherein said performing the task comprises extracting, from the multipage document, the subset of individual pages separately from the one or more pages of the multipage document not selected from the plurality of simultaneously displayed individual pages of the multipage document.

16. One or more computer-readable storage media storing instructions that are executable by one or more processors to perform operations comprising:
displaying a user interface including a simultaneous display of content within a defined content region and a first toolbar along an edge of the user interface adjacent and separate from the content, the first toolbar including selectable task category options that are each associated with different categories of tasks that are performable to affect the content, and the content displayed within the defined content region including a plurality of simultaneously displayed individual pages of a multipage document;
causing display of a secondary toolbar adjacent the first toolbar responsive to selection of a selectable task category option in the first toolbar, the secondary toolbar including selectable task options that are associated with different tasks within a task category represented by the selectable task category option;
receiving a plurality of inputs selecting a plurality of the simultaneously displayed individual pages, wherein the selected pages correspond to a subset of individual pages of the multipage document, and the subset of individual pages includes less than all of the pages of the multipage document, and greater than a single page of the multipage document;
displaying a representation of the subset of individual pages in the secondary toolbar;
causing display of a tertiary toolbar adjacent the secondary toolbar responsive to selection of a selectable task option from the secondary toolbar, the tertiary toolbar including: task parameters that each specify a different way in which a task represented by the selectable task option is to be performed in relation to the subset of individual pages of the multipage document, and a selectable representation of the task represented by the selectable task option from the secondary toolbar;
configuring the first toolbar, secondary toolbar, and tertiary toolbar as non-modal such that interaction with the content and the first toolbar, secondary toolbar, and tertiary toolbar is permitted during display of the first toolbar, secondary toolbar, and tertiary toolbar;
receiving a selection of one or more of the task parameters from the tertiary toolbar, and a subsequent selection of the selectable representation of the task represented by the selectable task option from the tertiary toolbar; and
performing the task on the content displayed within the user interface by processing the subset of individual pages of the multipage document using the selected one or more task parameters, and maintaining display of the first toolbar, secondary toolbar, and tertiary toolbar after performance of the task.

17. One or more computer-readable storage media as described in claim 16, wherein the display of the tertiary toolbar along with the content is configured to permit selection of one or more of the task parameters and interaction with the content before committing to the performance of the task through selection of the selectable representation of the task in the tertiary toolbar.

18. One or more computer-readable storage media as described in claim 16, wherein the edge of the user interface corresponds to an edge of a display device.

19. One or more computer-readable storage media as described in claim 16, wherein the selection of the selectable task option from the secondary toolbar to cause output of the tertiary toolbar causes output of an animation that moves or resizes the content in the user interface, the tertiary toolbar not obstructing display of the content.

20. One or more computer-readable storage media as described in claim 16, wherein:
the selected one or more task parameters further identify a relationship between the subset of individual pages, and one or more pages of the multipage document not selected from the plurality of simultaneously displayed individual pages of the multipage document; and
said performing the task comprises applying the task to the one or more pages of the multipage document not selected from the plurality of simultaneously displayed individual pages of the multipage document.

* * * * *